| United States Patent [19] | [11] Patent Number: 5,073,576 |
|---|---|
| Kuyzin et al. | [45] Date of Patent: Dec. 17, 1991 |

[54] POLYURETHANE-POLYISOCYANURATE STRUCTURAL RIM SYSTEMS WITH ENHANCED PROCESSING

[75] Inventors: Gregg S. Kuyzin, Southgate; John R. Stoll, Woodhaven, both of Mich.

[73] Assignee: BASF Corporation, Parsippany, N.J.

[21] Appl. No.: 546,190

[22] Filed: Jun. 28, 1990

[51] Int. Cl.$^5$ ............................................. C08G 18/14
[52] U.S. Cl. ..................................... 521/99; 521/164; 521/167
[58] Field of Search ......................... 521/99, 164, 167

[56] References Cited

U.S. PATENT DOCUMENTS 4,883,826  11/1989  Marugg et al. ..................... 521/167

*Primary Examiner*—Maurice J. Welsh
*Attorney, Agent, or Firm*—William G. Conger

[57] ABSTRACT

Low and high density structural RIM compositions are disclosed which have low viscosities. These compositions contain a resin "B-side" component which comprises a hydroxyl-functional tertiary amine polyol.

14 Claims, No Drawings

POLYURETHANE-POLYISOCYANURATE STRUCTURAL RIM SYSTEMS WITH ENHANCED PROCESSING

BACKGROUND OF THE INVENTION

1. Field of the Invention

The subject invention pertains to the field of fiber-reinforced reaction-injection-moldings. More particularly, the subject invention pertains to reactive systems useful in preparing rigid, fiber-reinforced polyurethane-polyisocyanurate parts especially adapted to the transportation and other industries. Such fiber-reinforced reaction-injection-molded systems and the resulting parts are known as structural-RIM or SRIM.

2. Description of the Related Art

Reaction-injection-molding (RIM) systems by now are well known to those skilled in the art. Commercial systems produce elastomeric products containing polyurethane-polyurea linkages which have many uses, for example as automobile facias. However, such systems have relatively low heat distortion temperatures and lack the flex modulus and tensile strength necessary for many applications. The chemistry of these reactive systems involves the use of a polyisocyanate "A side" (A component) and a "B side" employing a mixture of compounds containing isocyanate-reactive hydrogens. These "B side" components generally include one or more hydroxyl-functional polyether or polyester polyols and one or more sterically hindered diamines. The polyol components react with the isocyanate to form urethane linkages while the amine components react to form urea linkages. Such systems are disclosed, for example, in Weber U.S. Pat. No. 4,218,543.

The flex modulus and tensile strength of traditional RIM systems may be improved through the addition of short fiber reinforcement (RRIM). However, the addition of chopped fibers raises the viscosity of the system components as well as seriously affecting the ease of processing. Moreover, this addition of reinforcement has little effect on matrix dominated physical properties such as heat distortion temperature (HDT).

The use of woven or non-woven (random) fiber reinforcement (Structural RIM or SRIM) can provide parts with yet greater tensile strength and flex modulus. Furthermore, the physical properties may be made directional through the use of unidirectional fibers or combinations of both unidirectional and random fiber orientations. Unfortunately, the use of such reinforcement has not proven practical with traditional polyurethane-polyurea RIM systems due to the high viscosities of such systems. Finally, the low heat distortion temperature of such systems continues to present a detriment to the use of such systems. SRIM systems may be divided into cellular (blown) systems whose resin matrix has a density less then 1.0 g/cm$^3$ and whose fiber reinforced part has a flexural modulus of less than about 500,000 psi; and high density systems which are essentially non-cellular, have resin matrix densities greater than 1.0 g/cm$^3$, and whose flexural modulus is in excess of 500,000 psi.

In U.S. Pat. No. 4,035,331 are disclosed high density polyurethane RIM systems employing a polyisocyanate, an amine-initiated polyether polyol, and a liquid modifier having a boiling point above 150° C. all in the absence of a catalyst. The liquid modifier is present in an amount of from 5 to 60 weight percent, preferably from 15 to 40 weight percent of the overall system components. Systems which contain less than about 5 weight percent of modifier are said to produce unacceptable products, subject to swelling, cracking, and distortion. No mention is made of the viscosity of such systems or their suitability as SRIM systems.

In U.S. Pat. No. 4,709,002, some of the defficiencies of the '331 patent are overcome through the use of a polyisocyanate and a propylene carbonate adduct of a tertiary amine. The products of these systems are polyisocyanurate polymers which are suitable for use in SRIM systems. However, the alkylene carbonate tertiary amine adduct must be aged for considerable length of time, for example 500 hours, in order for its catalytic activity to stabilize somewhat. As the catalytic activity continues to change with time, such systems are not storage stable.

It would be desirable to formulate an SRIM system capable of providing a storage stable, high heat distortion system yet having a low viscosity suitable for both low density (microcellular) and high density (non-cellular) applications without the use of large amounts of liquid modifiers.

SUMMARY OF THE INVENTION

It has now been discovered that storage stable SRIM polyurethane-polyisocyanurate systems having low viscosity which provide parts having high heat distortion temperature may be prepared in the substantial absence of liquid modifiers and yet do not crack or distort, when certain tertiary amine polyols are used as the isocyanate-reactive component. Such systems may be utilized in both low density, open pour SRIM and low density and high density injection molded SRIM systems. Finally, low density systems lend themselves to use in all water-blown systems, eliminating the use of chlorofluorocarbons, although all CFC blown systems and co-blown (CFC and water) are also feasible.

DESCRIPTION OF THE PREFERRED EMBODIMENTS

The reactive components of the subject invention SRIM systems comprise one or more polyisocyanates and an isocyanate-reactive component which is a hydroxyl-functional tertiary amine polyether polyol. The isocyanate-reactive component in high density SRIM systems may optionally include a minor amount, i.e. 4 weight percent or less based on the total system weight, of a hydroxyl functional polyether or polyester polyol. In low density (cellular) SRIM systems, the isocyanate-reactive component may contain up to about 50 weight percent based on the total polyol (B-side) component of a conventional or graft polyol and or low molecular weight chain extender. Traditional polyurethane-polyisocyanurate system components such as fillers, flame retardants, catalysts, blowing agents, UV stabilizers, surfactants, dyes and pigments may also be added when necessary or desirable.

Polyisocyanates which may be used as the isocyanate component include the modified and unmodified polyisocyanates which are well known to those skilled in the art. Unmodified polyisocyanates include aromatic and aliphatic polyisocyanates such as 2,4- and 2,6-toluenediisocyanates, 2,4- and 2,6-methylcyclohexyldiisocyanates, 1,6-hexamethylenediisocyanate, isophoronediisocyanate, 2,4'-, 4,4'-, and 2,2-diphenylmethanediisocyanates, and polyphenylenepolymethylenepolyisocyanates. Mixtures of the above isocyanates as well as crude polyisocyanates, particularly less highly refined mixtures of the diphenylmethanediisocyanates and polyphenylenepolymethylenepolyisocyanates (crude MDI) may be useful.

Modified polyisocyanates may also be useful, particularly those isocyanates which have reduced viscosity. Examples of modified polyisocyanates include urethane, urea, biuret, and carbodiimide modified polyisocyanates. Such modified polyisocyanates are well known to those skilled in the art. Preferred isocyanates are the various diphenylmethanediisocyanates, their higher ring oligomers and their mixtures. Modified diphenylmethanediisocyanates and mixtures of such isocyanates with unmodified diphenlmethanediisocyanates and/or polyphenylenepolymethylene polyisocyanates are also preferred.

The isocyanate-reactive component comprises one or more hydroxyl-functional tertiary amine polyether polyols. Such polyols are prepared by oxyalkylating an aliphatic or aromatic amine, preferably an aliphatic amine, with an alkylene oxide. Examples of suitable aromatic amines which are useful as initiators include the various phenylenediamines, toluenediamines, and diphenylmethanediamines. Examples of suitable aliphatic amines include ethylenediamine, propylenediamine, 1,4-butanediamine, 1,6-hexanediamine, diethylenetriamine, triethylenetetraamine and the like. Hydroxyalkylamines may also be useful, for example 2-hydroxyethylamine and 2- and 3-hydroxypropylamine, bis[2-hydroxyethyl]ethylamine, tris[2-hydroxyethyl]amine and the like. The preferred initiators are 2-hydroxypropylamine and bis[2-hydroxyethyl]-2-hydroxypropylamine.

The amine or hydroxyalkylamine initiators are oxyalkylated with sufficient alkylene oxide to convert at least one and preferably all amino groups to tertiary amino groups. As alkylene oxides may be mentioned ethylene oxide, propylene oxide, and butylene oxide. Mixtures of these alkylene oxides may be used, or they or their mixtures may be used sequentially to form homopolymeric, block, heteric, or block-heteric polyether polyols. The process of preparation of such polyether polyols is conventional and is well known to those skilled in the art.

Preferred hydroxyl-functional tertiary amine polyether polyols are polyoxypropylated 2-hydroxypropylamines. Such polyols are trifunctional and may have molecular weights from about 194 to about 2000, and hydroxyl numbers from 50 to about 600, preferably from 250 to about 600, and most preferably about 500. Polyols with lower hydroxyl numbers tend to make the polyurethane-polyisocyanurate product more flexible, usually at the expense of the heat distortion temperature. Lower molecular weight, higher hydroxyl number polyols are used to prepare more rigid products.

The flexibility of the SRIM product matrix may also be adjusted by including lower or higher functionality hydroxyl-functional tertiary amine polyether polyols. For example, inclusion of polyols with a functionality of two lowers the crosslink density thus inci easing flexibility, while inclusion of polyols with functionalities of from 4 to 6 or higher lead to an increase in crosslink density. In general, systems with higher crosslink densities have greater rigidity and higher heat distortion temperatures.

Useful in minor amounts are amine initiated polyether polyols which have free amino hydrogens and hydroxyl-functional polyoxyalkylene moieties. Such polyols are prepared as taught by U.S. Pat. No. 4,517,383, by oxyalkylating an aliphatic or aromatic amine with a stoichiometric excess of alkylene oxide, but utilizing an extraordinarily high amount of basic oxyalkylation catalyst which must be present at the onset of oxyalkylation. Such dual-functionality assymetric polyols create both urethane and urea linkages in the finished product, and further have the advantage of lower viscosities than their fully oxyalkylated, symmetrical analogues.

Also useful in minor amounts, are conventional polyether polyols and acrylonitrile/styrene graft polymer polyol dispersions. Both these types of polyols are well known items of commerce, and generally have functionalities from two to about eight, preferably from 2 to about 3, and hydroxyl numbers from 20 to about 600, preferably from 20 to about 500. The use of such polyols increases the urethane linkages in the finished product. Use of graft polyols may increase the flexural modulus and tensile strength. In low density SRIM systems, the minor amount of conventional or graft polyols may be up to about half the total polyol component weight. In high density SRIM systems, however, the minor amount should be less than about 4 weight percent based on the total system weight.

The flexural modulus, heat distortion temperature, and rigidity of the matrix may also adjusted by varying the urethane/isocyanurate content of the product. The isocyanurate content is increased by increasing the ratio of isocyanate (A side) to polyol (B side). In general, isocyanate indices of from 100 to about 700 are useful, preferably from 120 to about 300, and most preferably from 150 to 250.

Hydroxyl-functional and amine-functional chain extenders may be used in both low density and high density SRIM systems. Preferred hydroxyl-functional chain extenders are ethylene glycol, glycerine, trimethylolpropane, 1,4-butanediol, propylene glycol, dipropylene glycol, 1,6-hexanediol, and the like. Suitable amine-functional chain extenders include the sterically hindered amines such as diethyltoluene diamine and the other hindered amines disclosed in Weber U.S. Pat. No. 4,218,543. In both high and low density SRIM systems, the amount of chain extender is generally less than 15 weight percent based on the total weight of the polyol component, preferably less than 10 weight percent. In high density SRIM systems, the amount of chain extender useful is generally very low, i.e. less than about 4 weight percent, and lower when a conventional or graft polyol is used. Prepolymers, particularly those prepared by reacting di- or polyisocyanates with polyester polyols may be used. Such prepolymers may desirably lower the system reactivity.

Plasticizers may also be used in the subject invention SRIM systems. In low density SRIM, the amount of plasticizer is generally less than 25 weight percent of the total polyol (B-side) component. In high density SRIM systems, generally no plasticizer is used, although very minor amounts, i.e. less than about 4 weight percent may be useful in some applications.

Mold releases, both external and internal, may be utilized. Internal mold releases are generally mixtures of long chain carboxylate salts, particularly ammonium and substituted ammonium stearates, and calcium and zinc stearates. External mold releases are well known commercial products and include waxes and silicones, for example.

In low density SRIM systems, a blowing agent is necessary. Water is the preferred blowing agent, and may be used in amounts of up to about 4 weight percent of the polyol (B-side) component. The density of the foam decreases with increasing water content. When water is used as the blowing agent, the polyisocyanate component is increased proportionately. Calculating the amount of water required and isocyanate required are routinely performed by those skilled in the arts of polyurethane and polyisocyanurate foams.

Chlorofluorocarbons (CFC's) and other volatile organic compounds may also be used as blowing agents, either alone, or in conjunction with water. When used alone, CFC blowing agents and other halogenated organics such as methylene chloride are generally used in amounts up to about 30 weight percent of the polyol component, preferably from 15 to about 25 weight percent. Other volatile organic compounds such as pentane, isopentane, acetone, and the like, are used in correspondingly lesser amounts due to their lower molecular weights. When co-blown, the CFC type blowing agents are utilized in lesser amounts, for example up to about 20 weight percent of the polyol component.

Flame retardants may also be used when required by the formulation. Suitable flame retardants are well known to those skilled in the art, but the low molecular weight halogenated phosphate esters, polyhalogenated biphenyls and biphenyloxides and the like may be used when flame retardants are necessary. As the presence of such flame retardants generally causes a decrease in physical properties, use of flame retardants is not preferred.

In high density SRIM systems, a water scavenger may be useful to prevent any blowing by trace amounts of water. Suitable water scavengers may be silica gels, anhydrous silica, and molecular sieves. A suitable molecular sieve which is available commercially is Baylith ® paste, available from the Mobay Chemical Company.

Ultraviolet stabilizers and absorbers may also be useful. Such stabilizers generally act by absorbing ultraviolet radiation. Many such ultraviolet absorbers are commercially vailable, such as the Uvinul ® absorbers manufactured by BASF Corporation, Parsippany, N.J.

Catalysts may also be useful, and are preferred in high density systems. Suitable catalysts include both urethane and isocyanurate reaction promoting catalysts, and are well known to those skilled in the art of polyurethanes. The presence of at least an effective amount of isocyanurate promoting catalyst is necessary. This catalyst may be purposely added, or may be present in the polyol by neutralization of the alkali metal polyoxyalkylation catalyst with a carboxylic acid. Preferred urethane catalysts are amine catalysts such as those available commercially from Air Products Chemical Company as DABCO ® X-8154 and DABCO ® 33LV. Preferred trimerization (isocyanurate) catalysts are metal carboxylates such as potassium 2-ethylhexanoate and potassium acetate. The latter is advantageously utilized as a 40 weight percent solution in ethylene glycol, referred to herein as KX25. The catalysts such as dibutyltindilaurate and dibutyltindiacetate are also useful urethane catalysts. Mixtures of amine and tin or other catalysts may be used.

When volatile organics are used as blowing agents, traditional polyurethane system surfactants are generally necessary. Such surfactants are well known to those skilled in the art. Preferred surfactants are DC190 and DC193, silicon-containing surfactants available from Dow-Corning, Midland, Mich.

Fibrous reinforcement suitable for use with SRIM is widely varied. Both woven and non-woven (random) reinforcement, or combinations thereof, may be used. Suitable fibers are synthetic fibers of nylon, polyester, aramid, polyetheretherketones, polyethersulfones, polyimides, and the like; natural fibers such as cotton, hemp, flax, jute; and mineral or ceramic fibers including Wollastonite alumina, glass fibers, and carbon fibers. Preferred fibrous reinforcement due to its low cost and physical properties is glass fiber, either woven or non-woven. A unique non-glass material is Colback ® spunbonded nonwoven comprised of a bicomponent fiber having a polyester core and polyamide skin, available from BASF Corporation, Fibers Division, Parsippany, N.J.

One or more layers of fiber reinforcement may be used depending on the desired fiber weight. Up to 70 weight percent of the SRIM part may comprise glass fiber reinforcement. When less dense reinforcement is utilized, the weight percent of reinforcement is generally less, for example up to about 50 weight percent of the part.

In addition to layers of fibrous reinforcement, chopped fibers and other fillers may be added to the isocyanate resin side of the system, the polyol side, or both in amounts up to about 70 weight percent of the SRIM part. Both man made reinforcement such as glass fiber, carbon fiber, silicon carbide fiber, ceramics and the like may be used, or natural reinforcement such as flaked mica, jute, cellulose fiber, among others.

When smooth surface finishes are required a surfacing skin or veil may be placed in the mold prior to injection of the reactive components. An alternative method is to spray or coat the mold with a surfacing paint or coating. Smooth finishes are facilitated when tightly woven glass fabrics or highly needed random reinforcements are utilized.

In low density SRIM, the fiber reinforcement and surfacing film or fabric, if any, are laid into the mold. The mold may be shot with the intimately mixed A and B sides while open and then closed, or may be closed and shot. The heat of reaction causes volatile blowing agents to vaporize, while water blown foams result from the reaction of water with the isocyanate. Following a reaction time of from several seconds to several minutes, the part may be demolded. Generally, a mold release coating is necessary. Either external mold releases or internal mold releases may be used.

In high density SRIM, the injection is under relatively high pressure, i.e. 170 bar. As no blowing agent is present, the resultant part is essentially noncellular. Mold temperature for both how density and high density SRIM is from 100°-180° C., preferably from 115°-150 ° F., and most preferably about 140° F.

Preferred low density SRIM systems comprise (A) an "A side" component comprising one or more polyisocyanates;

(B) a "B side" isocyanate reactive component, comprising (1) 60 weight percent or more of isocyanate-reactive compounds relative to the weight of component (B) which, based on the weight of component (1), comprises, (a) about 50 weight percent or more of a hydroxyl-functional tertiary amine polyol;

(b) less than about 50 weight percent of an isocyanate-reactive component selected from the group consisting of (i) convention polyoxyalkylene polyether polyols having hydroxyl numbers from 20 to about 600;

(ii) polyoxyalkylated amines having free amino hydrogens;

(iii) acrylonitrile/styrene graft polymer polyol dispersions;

(iv) hydroxyl-functional polyester polyols having hydroxyl numbers from 20 to about 600; and (v) mixtures thereof; and (c) up to about 15 percent of a low molecular weight isocyanate-reactive component selected from the group consisting of (i) hydroxyl-functional chain extenders having an average functionality of about 2 and a molecular weight of less than about 150;

(ii) hydroxyl-functional crosslinkers having an average functionality greater than 2 and a molecular weight of less than about 150;

(iii) sterically hindered aromatic amines having a molecular weight of less than about 400; and (iv) mixtures thereof; and (2) a blowing agent selected from the group consisting of (a) volatile organic compounds;

(b) water; and (c) mixtures thereof;

(3) up to about 25 weight percent based on the weight of component (B) of a plasticizer;

(4) an effective amount of an isocyanurate-promoting catalyst; wherein the isocyanate index of the system is from 100 to about 700, and wherein the viscosity of component (B) is less than about 1000 cp, preferably less than about 500 cp, and most preferably less than about 300 cp.

The preferred high density SRIM systems comprise

A) an "A Side" component comprising one or more polyisocyanates;

B) an isocyanate reactive component, comprising (1) 85 weight percent or more of a hydroxyl-functional tertiary amine polyol;

(2) up to about 8 weight percent, based on the weight of (B), of an isocyanate-reactive component selected from the group consisting of (a) hydroxyl-functional polyoxyalky polyether polyols having hydroxyl numbers of from 20 to about 600;

(b) hydroxyl-functional polyester polyols having hydroxyl numbers of from 20 to about 600;

(c) acrylonitrile/styrene graft polymer polyol dispersions;

(d) a low molecular weight isocyanate-reactive component selected from the group consisting of (i) hydroxyl-functional chain extenders having an average functionality of about 2 and a molecular weight less than about 150.

(ii) hydroxyl-functional crosslinkers having an average functionality greater than 2 and a molecular weight less than 150; and (iii) mixtures thereof;

(3) up to about 14 weight percent based on the weight of (B) of a sterically hindered aromatic diamine chain extender; and wherein the isocyanate index is from 100 to about 700, and wherein the viscosity of component B is less than about 500 cps. Preferably, the high density SRIM forming composition contains no plasticizer and no reactive or nonreactive liquid diluents or modifiers.

The subject invention will now be illustrated by several examples. In the examples, all parts are parts by weight.

EXAMPLES 1-7 LOW AND HIGH DENSITY SRIM FORMULATIONS

Low density SRIM formulations were prepared according to Table I. In Table I, the tertiary amine polyol is an oxypropylated ethanolamine having a hydroxyl number of about 500 and a water content of 0.05 weight percent maximum and a functionality of 2.98. Residual oxyalkylation catalyst (potassium hydroxide) was neutralized with 2-ethylhexanoic acid. Catalyst A is a 40 weight percent solution of potassium acetate in ethylene glycol, catalyst B is 50 weight percent solution of potassium acetate in ethylene glycol, catalyst C is dimethylcyclohexylamine, Catalyst D is DABCO® 33LV, while Catalyst E is DABCO x-8154. Plasticizer A is Plastolein® 9214, a plasticizer supplied by Quantum Chemical Corporation and believed to be an epoxidized fatty ester. Surfactant A is DC190, while surfactant B is DC193, both surfactants useful in formulating polyurethane foams, and which are supplied by the Dow Corning Company. Polyol A is a tertiary amine based polyol polyether polyol having a functionality of 3 and a hydroxyl number of 500. Polyol B is Dianol 2210, a polyoxypropylene glycol supplied by Akzo, having a functionality of 2 and a hydroxyl number of 280. Polyol C is SD490, a polyether polyol having a functionality of 4.4 and a hydroxyl number of 490 supplied by Alkaril Chemicals, Ltd.

Isocyanate M10 is a polymeric isocyanate having an NCO content of 32 weight percent, and a viscosity of 60 cps when measured at 25 C; isocyanate M20S is a polymeric isocyanate having an NCO content of 31.8 weight percent and a viscosity of 195 cps at 25 C. Isocyanate MM103, a carbodiimide modified methylenediphenylene diisocyanate having an NCO content of 29.5 weight percent and a viscosity of 50 cps at 25 C, has also been found to work well in these systems.

Material selection exclusive of fibrous reinforcement is shown in Table 1 and the parameters of use are shown in Table 2.

TABLE 1

| Component[1] | Example | | | | |
|---|---|---|---|---|---|
| | 1[2] | 2[3] | 3[3] | 4[3] | 5[4] |
| Polyol A | 64.4 | 67 | 37.5 | 36 | 98 |
| Polyol B | 4.0 | | | | |
| Polyol C | | | 28.1 | 27 | |
| Plasticizer A | | 19 | 18.8 | 22.5 | |
| Glycerine | 6.4 | 7.7 | 7.1 | 6.8 | |
| Surfactant A | 1.6 | 1.9 | | | |
| Surfactant B | | | 1.9 | 1.8 | |
| Catalyst A | 1.2 | | 1.5 | 0.45 | |

TABLE 1-continued

| Component[1] | Example | | | | |
|---|---|---|---|---|---|
| | 1[2] | 2[3] | 3[3] | 4[3] | 5[4] |
| Catalyst B | | | | | 0.7 |
| Catalyst C | 1.6 | | 0.8 | 0.45 | |
| Catalyst D | | | | | 0.3 |
| Catalyst E | | | | 0.1 | |
| Water | 0.8 | 2.4 | 2.4 | 2.9 | |
| CFC R11 B | 20.0 | | | | |
| Carbon Black | 1.5 | 1.9 | 1.9 | 2.0 | |
| Baylith ® Paste | | | | | 1.0 |
| | 100 wt % | 100 wt % | 100 wt % | 100 wt % | 100 wt % |

[1]These components are for the resin side of the two-component chemical system, resin and isocyanate
[2]Low density SRIM co-blown chemical system
[3]Low density SRIM water blown chemical system
[4]High density SRIM unblown chemical system The results of physical testing of various systems at various resin/iso ratios and with various reinforcements types and content are give below.

TABLE 2

| Property | Example | | | | |
|---|---|---|---|---|---|
| | 1[1] | 2 | 3 | 4 | 5 |
| Viscosity of Resin at 25° C., cp | <100 | 150 | 1250 | 800 | 290 |
| Isocyanate Used with Resin | M20S | M20S | M20S | M20S | M10 |
| Viscosity of Isocyanate at 25° C., cp | 195 | 195 | 195 | 195 | 60 |
| Foam Free Rise Density, PCF | 6.25 | 2.75 | 3.20 | 2.75 | 68.6 |
| Resin/Isocyanate Ratios Used | A 100/120 | A 100/120 B 100/150 C 100/180 | A 100/150 B 100/170 C 100/180 | A 100/160 | A 100/160 |

[1]Trials A, B, C

Process conditions are shown in Table 3. For low-density SRIM chemical systems, the process can be considered to be one of a foam dispersed into a reinforcement mat within an open or closed mold cavity. Initial dispersal of the system is in a period of time less than the cream time of the material and in such a fashion that the mold is only partially filled. After the inception of cream, the foam flows through the reinforcement within the closed and heated mold cavity to create or composite part that has no voids and has cured sufficiently to be handled after removal For the high density SRIM system, the process can be considered to be one of closed injection of a non-foam dispersed into a reinforcement mat under pressure and in a period of time less than the gel time of the material. In-mold paint, in-mold coatings, in-mold fabrics, and miscellaneous hardware can be placed in the mold at the time of molding with these chemical systems. In Table 4a and 4b, the trial designations, for example 2A-1 and 2B-4 indicate by their first digit the composition of the resin/isocyanate from Table 1; by A, B, or C the isocyanate index as in Table 2; and by the last digit, the numerical trial. Thus 2B-4 is trial number 4, using the chemistry of Example 2 from Table 1 at an isocyanate index of 150.

TABLE 3

| Typical Process Conditions | |
|---|---|
| Dispensing Machine | Elastogran Puromat 80 typ |
| Component Temperatures: | |
| A-Comp., Polyol Resin | 73° F. (23° C.) |
| B-Comp., Isocyanate | 73° F. (23° C.) |
| Component Impingement Mixing Pressures: | |
| A-Comp. | 2200-2500 psi (150-170 bar) |
| B-Comp. | 2200-2500 psi (150-170 bar) |
| Molded Temperature | 140° F. (60° C.) |
| Demold time | 2 minutes typ. for low-density SRIM, 1 minute typ. for high-density SRIM |
| Cream time | 20 seconds typ. for low-density SRIM |
| Gel time | 1.6 lb typ. (726 p typ.) for high-density SRIM |
| Free rise density | 2.8 lb/cu ft. typ. (.004 g/cc typ.) 10 sec. typ. for high-density SRIM |
| Short rate | 0.5 lb/sec. typ. (227 g/sec typ.) |
| Short size | 0.8 lb typ. (353 g typ.) for low-density SRIM |
| Mold pressure | 80-100 psi typ. for low-density SRIM 200 psi typ. for high-density SRIM |

TABLE 4a

| Plaque* Data, Blown Chemical Systems | | | | | | |
|---|---|---|---|---|---|---|
| | | Example: | | | | |
| REINFORCEMENT PROPERTY | PUBLISHED METHOD | 2A-1 OCF 8610 GLASS MAT 29.5 wt % GLASS | 2A-2 OCF 8610 GLASS MAT 28.8 wt % GLASS | 2A-3 0 wt % GLASS | 2B-4 OCF 8610 GLASS MAT 28.3 wt % GLASS | 2B-5 OCF 8610 GLASS MAT 28.2 wt % GLASS |
| Thickness (in.) | FBTM 57-4 | 0.163 | 0.169 | 0.178 | 0.200 | 0.193 |
| Specific Gravity | ASTM D104 | 0.344 | 0.344 | 0.187 | 0.306 | 0.300 |
| Warpage % | FBTM 58-28 | 0 | 0 | 4 | 0 | 1 |

TABLE 4a-continued

| Plaque* Data, Blown Chemical Systems) | | | | | | |
|---|---|---|---|---|---|---|
| Tensile Strength (PSI) | ASTM D103 | 2100 | 2100 | 400 | 1500 | 1900 |
| Flex Strength (PSI) | ASTM D790 | 2800 | 2400 | 400 | 2300 | 2500 |
| Flex Modulus (PSI) | ASTM D790 | 126,000 | 100,000 | 15,000 | 94,000 | 119,000 |
| Flammability (in/min) | MVSS 302 | 0.2 | 0.4 | 1.0 | 0.2 | 0.2 |
| Heat Distortion (°F.) (264 PSI Load) | | 190 | 160 | 140 | 180 | 170 |
| 24 Hr. Water Absorption (%) | SAE J315 | 3 | 3 | 8 | 2 | 2 |
| Water Swell (%) | SAE J315 | 1.9 | 1.2 | 3.5 | 1.7 | 0 |
| Dimensional Stability | SAE J315 | | | | | |
| Expansion, 70° F., 24 hrs. | | 0.1 | 0.1 | 0.1 | 0.2 | 0.3 |
| Contraction, 190° F., 24 hrs. | | 0.2 | 0.1 | 0.2 | 0.1 | 0.2 |
| Coefficient of Linear Thermal Expansion (in./in. °F.) | ASTM D696 | $4.5 \times 10^{-6}$ | $4.5 \times 10^{-6}$ | $1 \times 10^{-5}$ | $1.5 \times 10^{-6}$ | $4.5 \times 10^{-6}$ |

| | | Example: | | | | |
|---|---|---|---|---|---|---|
| REINFORCEMENT PROPERTY | PUBLISHED METHOD | 2B-6 OCF 8610 GLASS MAT 29.2 wt % GLASS | 2B-7 OCF 8610 GLASS MAT 30.4 wt % GLASS | 2B-8 COLBACK N80 7.9 wt % COLBACK | 2B-9 COLBACK N100 9.7 wt % COLBACK | 2B-10 COLBACK N120 11.4 wt % COLBACK |
| Thickness (in.) | FBTM 57-4 | 0.178 | 0.142 | 0.182 | 0.159 | 0.173 |
| Specific Gravity | ASTM D104 | 0.312 | 0.317 | 0.223 | 0.213 | 0.239 |
| Warpage % | FBTM 58-28 | 0 | 0 | 0 | 0 | 0 |
| Tensile Strength (PSI) | ASTM D103 | 1500 | 2200 | 600 | 500 | 600 |
| Flex Strength (PSI) | ASTM D790 | 2300 | 2300 | 600 | 600 | 600 |
| Flex Modulus (PSI) | ASTM D790 | 86,000 | 96,000 | 22,000 | 22,000 | 23,000 |
| Flammability (in/min) | MVSS 302 | 0.2 | 0.2 | 0.8 | 0.6 | 0.8 |
| Heat Distortion (°F.) (264 PSI Load) | | 170 | 180 | 140 | 140 | 160 |
| 24 Hr. Water Absorption (%) | SAE J315 | 2 | 2 | 3 | 4 | 4 |
| Water Swell (%) | SAE J315 | 1.9 | 2.2 | 1.0 | 0.5 | 0.5 |
| Dimensional Stability | SAE J315 | | | | | |
| Expansion, 70° F., 24 hrs. | | 0.2 | 0.3 | 0.1 | 0.6 | 0.9 |
| Contraction, 190° F., 24 hrs. | | 0.0 | 0.0 | 0.3 | 0.3 | 0.1 |
| Coefficient of Linear Thermal Expansion (in./in. °F.) | ASTM D696 | $9 \times 10^{-6}$ | $1.5 \times 10^{-6}$ | $7.3 \times 10^{-6}$ | $3.0 \times 10^{-6}$ | $1.5 \times 10^{-6}$ |

| | | Example: | | | | |
|---|---|---|---|---|---|---|
| REINFORCEMENT PROPERTY | PUBLISHED METHOD | 2B-11 COLBACK 2 × N80 14.8 wt % COLBACK | 2B-12 COLBACK 4 × N80 23.3 wt % COLBACK | 2B-13 COLBACK 5 × N120 1 × N80 33.3 wt % COLBACK | 2B-14 COLBACK 10 × N100 42.6 wt % COLBACK | 2B-15 0 wt % COLBACK |
| Thickness (in.) | FBTM 57-4 | 0.184 | 0.165 | 0.183 | 0.184 | 0.151 |
| Specific Gravity | ASTM D104 | 0.242 | 0.300 | 0.503 | 0.524 | 0.203 |
| Warpage % | FBTM 58-28 | 0 | 0 | 0 | 0 | 0 |
| Tensile Strength (PSI) | ASTM D103 | 1600 | 1200 | 2400 | 3200 | 600 |
| Flex Strength (PSI) | ASTM D790 | 600 | 1300 | 2500 | 3200 | 500 |
| Flex Modulus (PSI) | ASTM D790 | 20,000 | 41,000 | 91,000 | 112,000 | 20,000 |
| Flammability (in/min) | MVSS 302 | 0.2 | 0.2 | 0.2 | 0.2 | 0.4 |
| Heat Distortion (°F.) (264 PSI Load) | | 160 | 150 | 160 | 170 | 150 |
| 24 Hr. Water Absorption (%) | SAE J315 | 3 | 2 | 1 | 2 | 3 |
| Water Swell (%) | SAE J315 | 1.5 | 0.5 | 1.4 | 2.0 | 2.8 |
| Dimensional Stability | SAE J315 | | | | | |
| Expansion, 70° F., 24 hrs. | | 0.8 | 0.5 | 0.6 | 0.3 | 1.0 |
| Contraction, 190° F., 24 hrs. | | 0.2 | 0.1 | 0.1 | 0.2 | 0.2 |
| Coefficient of Linear Thermal Expansion (in./in. °F.) | ASTM D696 | $1.5 \times 10^{6}$ | $6.0 \times 10^{-6}$ | $1.5 \times 10^{-6}$ | $4.5 \times 10^{-6}$ | $1.5 \times 10^{-6}$ |

| | | Example: | | | | |
|---|---|---|---|---|---|---|
| REINFORCEMENT PROPERTY | PUBLISHED METHOD | 2B-16 OCF 8610 GLASS MAT 29.0 wt % GLASS | 2C-17* 0 wt % GLASS | 3A** OCF 8610 GLASS MAT 31 wt % GLASS | 3B** OCF 8610 GLASS MAT 31 wt % GLASS | 3C** OCF 8610 GLASS MAT 31 wt % GLASS |
| Thickness (in.) | FBTM 57-4 | 0.242 | 0.178 | 0.170 | 0.150 | 0.160 |
| Specific Gravity | ASTM D104 | 0.267 | 0.160 | 0.55 | 0.55 | 0.55 |
| Warpage % | FBTM 58-28 | 0 | 2 | — | — | — |
| Tensile Strength (PSI) | ASTM D103 | 1000 | 380 | 3100 | 3000 | 3200 |
| Flex Strength (PSI) | ASTM D790 | 1100 | 520 | 4900 | 4100 | 2800 |
| Flex Modulus (PSI) | ASTM D790 | 66,000 | 17,000 | 482,000 | 163,000 | 100,00 |

TABLE 4a-continued (Plaque* Data, Blown Chemical Systems)

| | | | | | | |
|---|---|---|---|---|---|---|
| Flammability (in/min) | MVSS 302 | 0.4 | 0.5 | Self Extinguish | Self Extinguish | Self Extinguish |
| Heat Distortion (°F.) (264 PSI Load) | | 200 | 148 | — | — | — |
| 24 Hr. Water Absorption (%) | SAE J315 | 2 | 1.8 | — | — | — |
| Water Swell (%) | SAE J315 | 2.1 | 6.9 | — | — | — |
| Dimensional Stability | SAE J315 | | | | | |
| Expansion, 70° F., 24 hrs. | | 0.1 | 1.2 | — | — | — |
| Contraction, 190° F., 24 hrs. | | 0.4 | 0.2 | — | — | — |
| Coefficient of Linear Thermal Expansion (in./in. °F.) | ASTM D696 | 9.0 × 10$^{-6}$ | 9.1 × 10$^{-6}$ | — | — | — |

| | | Example: | | |
|---|---|---|---|---|
| REINFORCEMENT PROPERTY | PUBLISHED METHOD | 4A-1** OCF 8610 GLASS MAT 24.4 wt % GLASS | 4A-2* OCF 8610 GLASS MAT 27.0 wt % GLASS | 4A-3* OCF 8610 GLASS MAT 31.0 wt % |
| Thickness (in.) | FBTM 57-4 | 0.103 | 0.106 | 0.105 |
| Specific Gravity | ASTM D104 | 0.716 | 0.841 | 0.553 |
| Warpage % | FBTM 58-28 | 0.4 | 0.4 | 0.01 |
| Tensile Strength (PSI) | ASTM D103 | 8700 | 10,400 | 5400 |
| Flex Strength (PSI) | ASTM D790 | 12,000 | 11,000 | 8800 |
| Flex Modulus (PSI) | ASTM D790 | 453,000 | 413,000 | 387,000 |
| Flammability (in/min) | MVSS 302 | Self Extinguish | Self Extinguish | Self Extinguish |
| Heat Distortion (°F.) (264 PSI Load) | | — | — | — |
| 24 Hr. Water Absorption (%) | SAE J315 | — | — | — |
| Water Swell (%) | SAE J315 | — | — | — |
| Dimensional Stability | SAE J315 | | | |
| Expansion, 70° F., 24 hrs. | | 0.04 | 0.04 | 0.03 |
| Contraction, 190° F., 24 hrs. | | 0.04 | 0.04 | 0.01 |
| Coefficient of Linear Thermal Expansion (in./in. °F.) | ASTM D696 | — | — | — |

*21" × 21"
**Notched Izod Impacts 5.26–5.52 ft-lb/in

TABLE 4b (Plaque* Data, Unblown Chemical Systems**)

| | | Example: | | | | | |
|---|---|---|---|---|---|---|---|
| REINFORCEMENT PROPERTY | PUBLISHED METHOD | 5A-1 NICO 751 GLASS MAT 15.6 wt % GLASS | 5A-2 NICO 751 GLASS MAT 25.9 wt % GLASS | 5A-3 NICO 751 GLASS MAT 34.0 wt % GLASS | 5A-4 0 wt % GLASS | 5A-5 OCF 8610 GLASS MAT 11.3 wt % GLASS | 5A-6 OCF 8610 GLASS MAT 20.1 wt % GLASS |
| Thickness (in.) | | 0.125 | 0.125 | 0.125 | 0.125 | 0.125 | 0.125 |
| Flex Modulus (PSI) | ASTM D790 | 240,000 | 800,000 | 770,000 | 330,000 | 630,000 | 830,000 |
| Flex Strength (PSI) | ASTM D790 | 7100 | 21,900 | 20,100 | 9200 | 13,800 | 20,700 |
| Tensile Strength (PSI) | ASTM D103 | 7600 | 12,300 | 15,900 | 7000 | 7100 | 10,800 |
| Izod Impact (Notched) (ft-lb/in.) | | 5.5 | — | 10.0 | 0.28 | 4.4 | 5.6 |
| Heat Distortion (°F.) (264 PSI Load) | | 246 | 312 | 327 | 190 | 206 | 315 |

| | | Example: | | | | |
|---|---|---|---|---|---|---|
| REINFORCEMENT PROPERTY | PUBLISHED METHOD | 5A-7 OCF 8610 GLASS MAT 28.0 wt % GLASS | 5A-8 OCF 8610 GLASS MAT w/COLBACK N120 BOTH SIDES OF THE GLASS MAT 28.0 wt % GLASS 8.7 wt % COLBACK | 5A-9 COLBACK N120 MAT 3.7 wt % COLBACK | 5A-10 COLBACK N120 MAT 14.9 wt % COLBACK | 5A-11 COLBACK N120 MAT 26.8 wt % COLBACK |
| Thickness (in.) | | 0.125 | 0.125 | 0.125 | 0.125 | 0.125 |
| Flex Modulus (PSI) | ASTM D790 | 933,000 | 320,000 | 320,000 | 360,000 | 418,000 |
| Flex Strength (PSI) | ASTM D790 | 24,200 | 9400 | 8500 | 10,000 | 11,200 |
| Tensile Strength (PSI) | ASTM D103 | 18,600 | 21,300 | 5500 | 6600 | 7500 |
| Izod Impact (Notched) | | 8.7 | 8.8 | 0.37 | 2.18 | 3.20 |

TABLE 4b-continued

| (Plaque* Data. Unblown Chemical Systems**) | | | | | |
|---|---|---|---|---|---|
| (ft-lb/in.) | | | | | |
| Heat Distortion | 325 | 321 | 178 | 196 | 193 |
| (°F.) | | | | | |
| (264 PSI Load) | | | | | |

Unblown Density = 70 lb/ft³
*21" × 21"
**However, the entrainment of air may occur during the molding process

I claim:

1. A reactive composition suitable for preparing rigid, polyurethane-polyisocyanurate, low density structural RIM parts having a density of less than 1.0 g/cm³, comprising:
    (A) an "A side" component comprising one or more polyisocyanates;
    (B) A "B side" isocyanate reactive component, comprising 60 weight percent or more relative to the weight of the (B) component of isocyanate reactive compounds, and
    (C) an amount of an isocyanurate promoting catalyst effective to catalyze the formation of isocyanurate linkages, wherein said reactive components (B) comprise a minimum of about 50 weight percent of a hydroxyl-functional tertiary amine polyol wherein said hydroxyl-functional tertiary amine polyol is prepared by oxyalkylating an initiator selected from the group consisting of aryl amines, aliphatic amines, and hydroxyalkylamines wherein said (B) component further comprises a blowing agent; wherein the viscosity of said (B) component is less than about 1000 cp, and wherein the isocyanate index calculated from the (A) and (B) components is greater than 100.

2. The composition of claim 1 wherein said (B) component further comprises up to 15 weight percent of an isocyanate-reactive compound selected from the group consisting of
    (1) hydroxyl-functional chain extenders having an average functionality of about 2 and a molecular weight of less than about 150;
    (2) hydroxyl-functional crosslinkers having an average functionality of greater than about 2 and a molecular weight less than about 150;
    (3) sterically hindered aromatic amines having a molecular weight of less than about 400; and
    (4) mixtures thereof.

3. The composition of claim 1 wherein said component (B) further comprises up to about 20 weight percent of a plasticizer.

4. The composition of claim 2 wherein said component (B) further comprises up to about 20 weight percent of a plasticizer.

5. The composition of claim 1 wherein said (B) component further comprises an isocyanate-reactive compound selected from the group consisting of
    (1) hydroxyl-functional polyether polyols having hydroxyl numbers from 20 to about 600;
    (2) hydroxyl-functional polyester polyols having a hydroxyl number from 20 to about 600;
    (3) amine functional polyether polyols;
    (4) polyether polyols prepared by oxyalkylating an amine in such a manner that the resulting polyether polyol polyols contains both hydroxyl-functional polyoxyalkylene groups and free amino hydrogens;
    (5) graft polymer polyether polyol dispersions; and
    (6) mixtures thereof.

6. The composition of claim 2 wherein said (B) component further comprises an isocyanate-reactive compound selected from the group consisting of
    (1) hydroxyl-functional polyether polyols having hydroxyl numbers from 20 to about 600;
    (2) hydroxyl-functional polyester polyols having a hydroxyl number from 20 to about 600;
    (3) amine functional polyether polyols;
    (4) polyether polyols prepared by oxyalkylating an amine in such a manner that the resulting polyether polyol polyols contains both hydroxyl-functional polyoxyalkylene groups and free amino hydrogens;
    (5) graft polymer polyether polyol dispersions; and
    (6) mixtures thereof.

7. The composition of claim 3 wherein said (B) component further comprises an isocyanate-reactive compound selected from the group consisting of
    (1) hydroxyl-functional polyether polyols having hydroxyl numbers from 20 to about 600;
    (2) hydroxyl-functional polyester polyols having a hydroxyl number from 20 to about 600;
    (3) amine functional polyether polyols;
    (4) polyether polyols prepared by oxyalkylating an amine in such a manner that the resulting polyether polyol polyols contains both hydroxyl-functional polyoxyalkylene groups and free amino hydrogens;
    (5) graft polymer polyether polyol dispersions; and
    (6) mixtures thereof.

8. The composition of claim 4 wherein said (B) component further comprises an isocyanate-reactive compound selected from the group consisting of
    (1) hydroxyl-functional polyether polyols having hydroxyl numbers from 20 to about 600;
    (2) hydroxyl-functional polyester polyols having a hydroxyl number from 20 to about 600;
    (3) amine functional polyether polyols;
    (4) polyether polyols prepared by oxyalkylating an amine in such a manner that the resulting polyether polyol polyols contains both hydroxyl-functional polyoxyalkylene groups and free amino hydrogens;
    (5) graft polymer polyether polyol dispersions; and
    (6) mixtures thereof.

9. A composition suitable for the preparation of rigid, high density, polyurethane-polyisocyanurate structural RIM parts having a density greater than 1.0 g/cm³, comprising:
    (A) an "A side" component comprising one or more polyisocyanates; and
    (B) a "B side" isocyanate-reaction component, comprising at least 85 weight percent or more of a hydroxyl-functional tertiary amine polyol wherein said hydroxyl-functional tertiary amine polyol is prepared by oxyalkylating an initiator selected from the group consisting of aryl amines, aliphatic amines, and hydroxyalkylamines; and
    (C) less than about 8 weight percent based on the weight of component (B) of an isocyanate reactive component selected from the group consisting of (1) hydroxyl-functional polyether polyols having hydroxyl numbers from 20 to about 600;
(2) hydroxyl-functional polyester polyols having a hydroxyl number from 20 to about 600;
(3) amine functional polyether polyols;
(4) polyether polyols prepared by oxalkylating an amine in such a manner that the resulting polyether polyol polyols contains both hydroxyl-functional polyoxyalkylene groups and free amino hydrogens;
(5) graft polymer polyether polyol dispersions; and
(6) mixtures thereof, wherein the viscosity of said component (B) is less than about 1000 cp, and wherein he isocyanate index calculated from the (A) and (B) components is greater than about 100.

10. The composition of claim 9 wherein said composition further comprises up to about 15 weight percent based on component (B) of an isocyanate-reactive compound selected from the group consisting of (1) hydroxyl-functional chain extenders having an average functionality of about 2 and a molecular weight of less than about 150;
(2) hydroxyl-functional crosslinkers having an average functionality of greater than about 2 and a molecular weight less than about 150;
(3) sterically hindered aromatic amines having a molecular weight of less than about 400; and
(4) mixtures thereof.

11. The composition of claim 9 wherein said hydroxyl-functional tertiary amine polyol has been prepared by oxyalkylating 2-hydroxyethylamine with from 3 to about 20 moles of alkylene oxide.

12. The composition of claim 10 wherein said hydroxyl-functional tertiary amine polyol has been prepared by oxyalkylating 2-hydroxyethylamine with from 3 to about 20 moles of alkylene oxide.

13. A low density SRIM part containing fibrous reinforcement and the reaction product of the composition of claim 1.

14. A high density SRIM part containing fibrous reinforcement and the reaction product of the composition of claim 9.

* * * * *